Nov. 6, 1934.　　　　F. G. PECK　　　　1,979,993
CONTAINER SETTING-UP MACHINE
Filed Sept. 17, 1931　　12 Sheets-Sheet 3
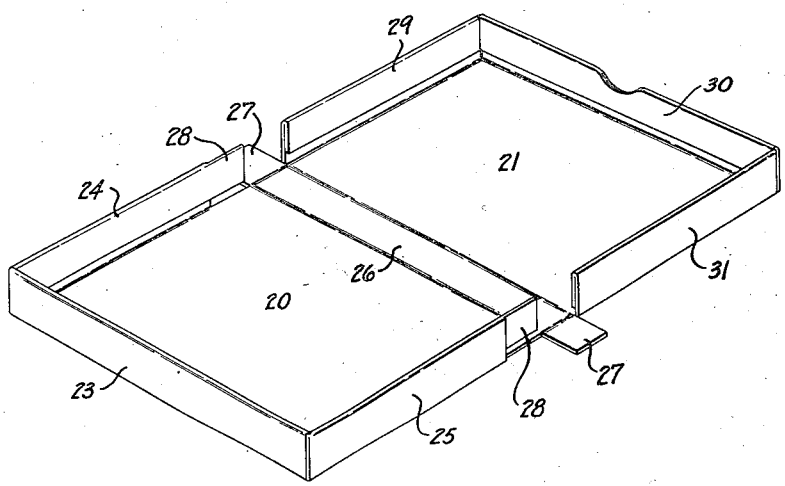
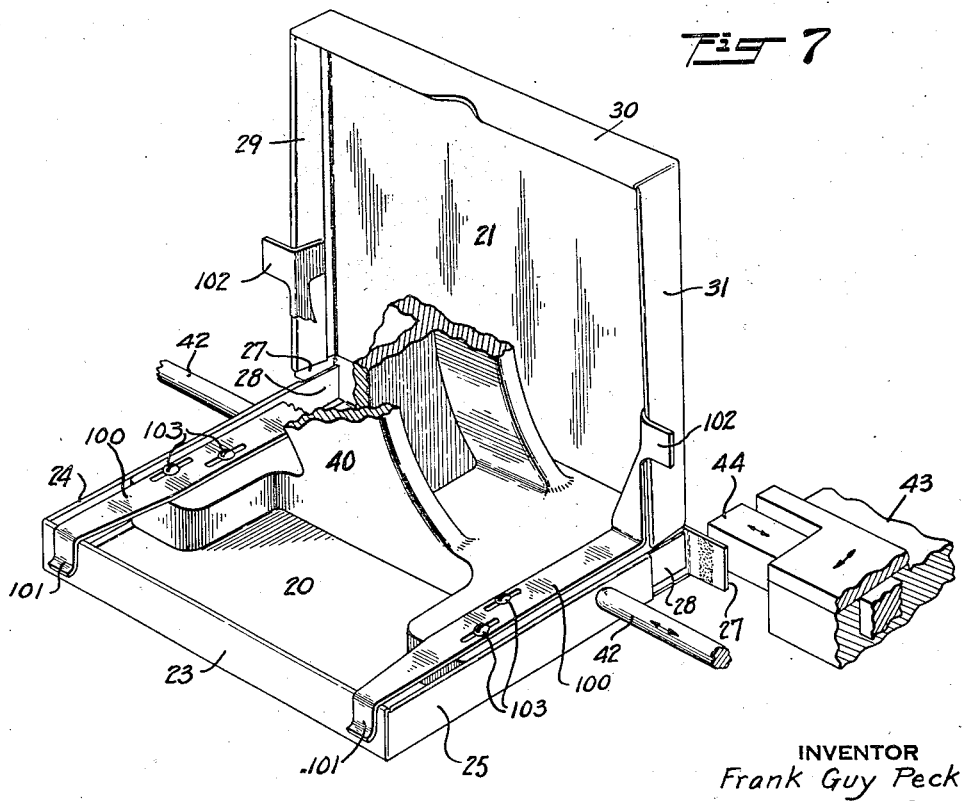
INVENTOR
Frank Guy Peck
BY
ATTORNEY

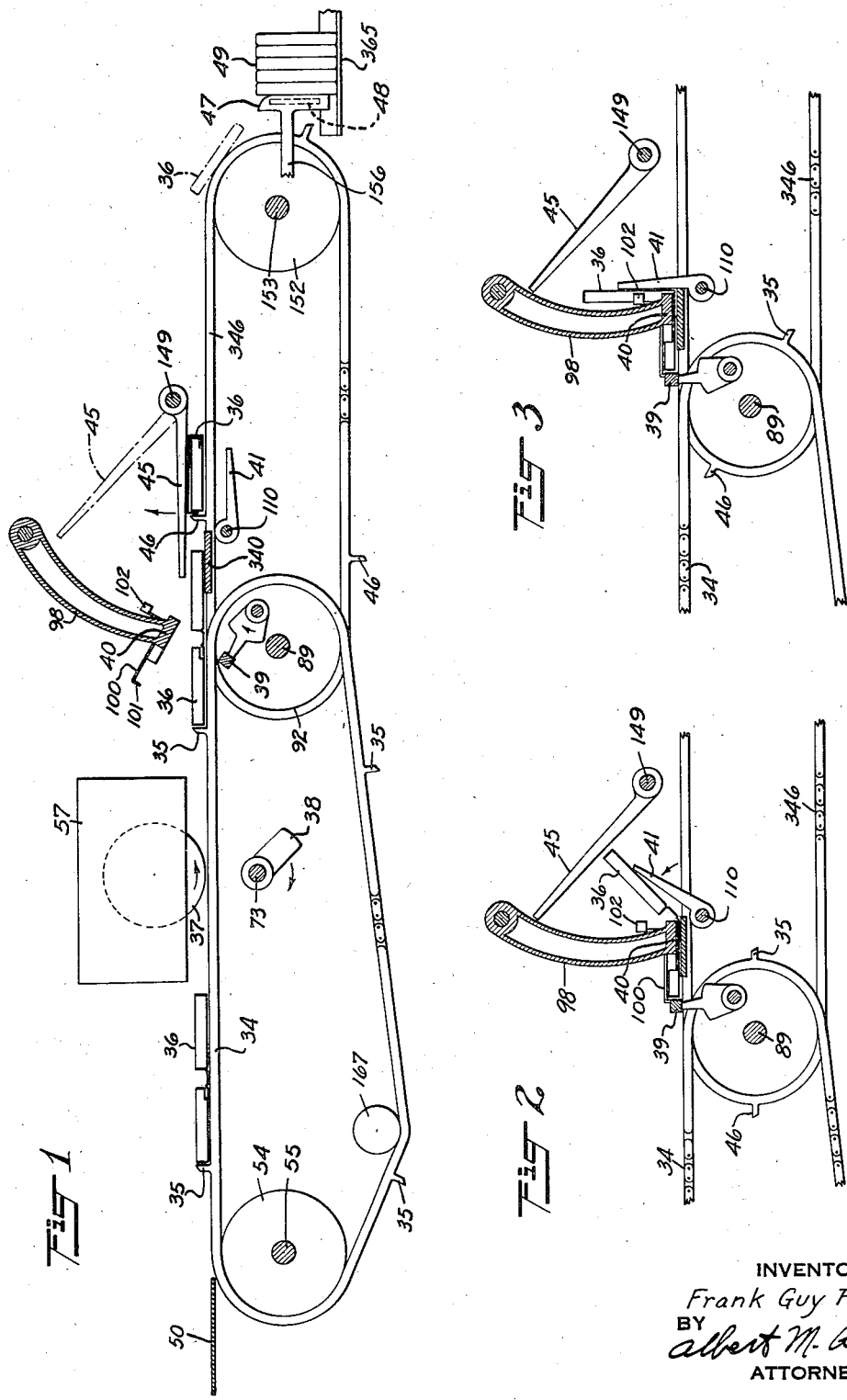

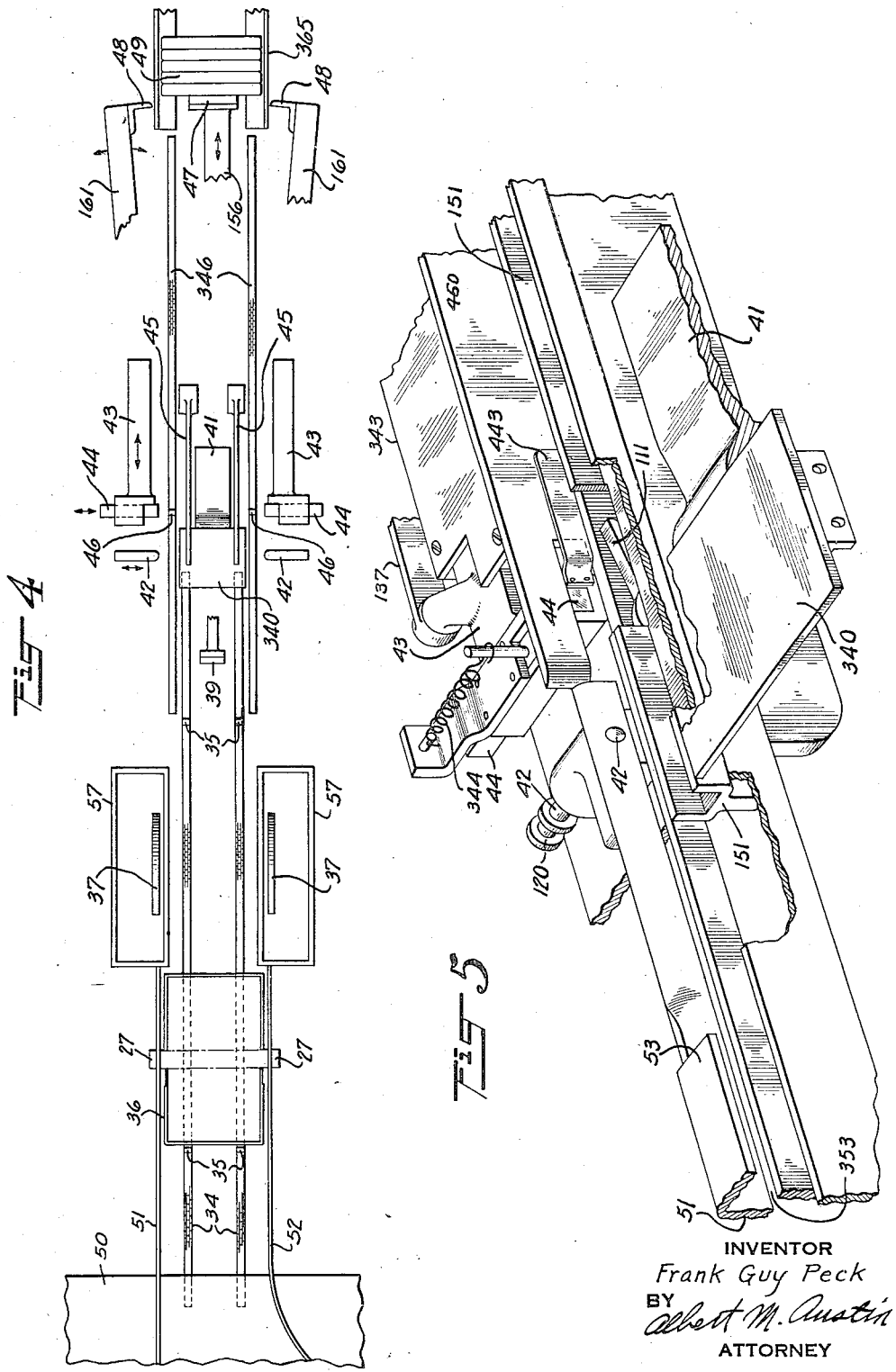

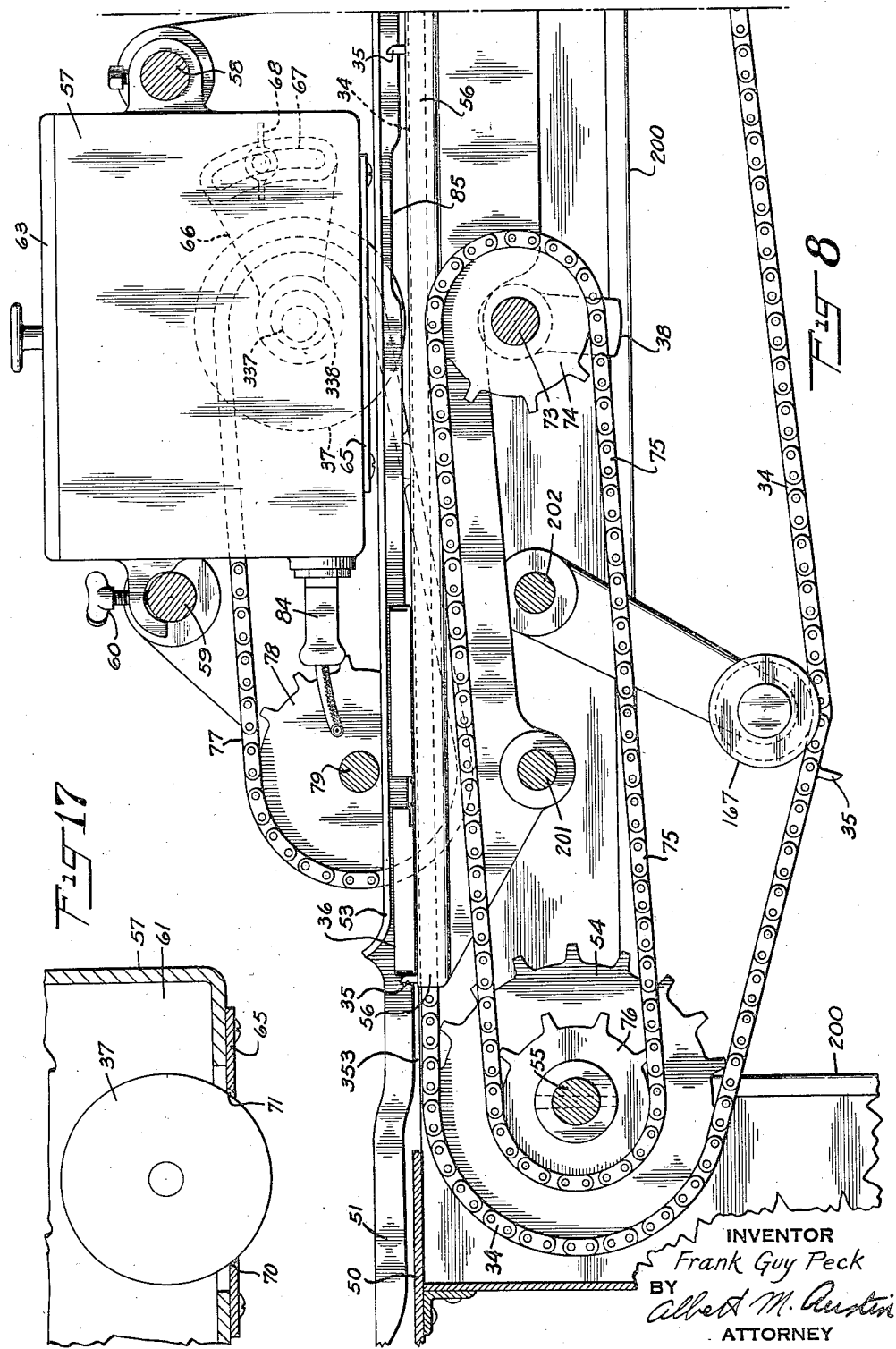

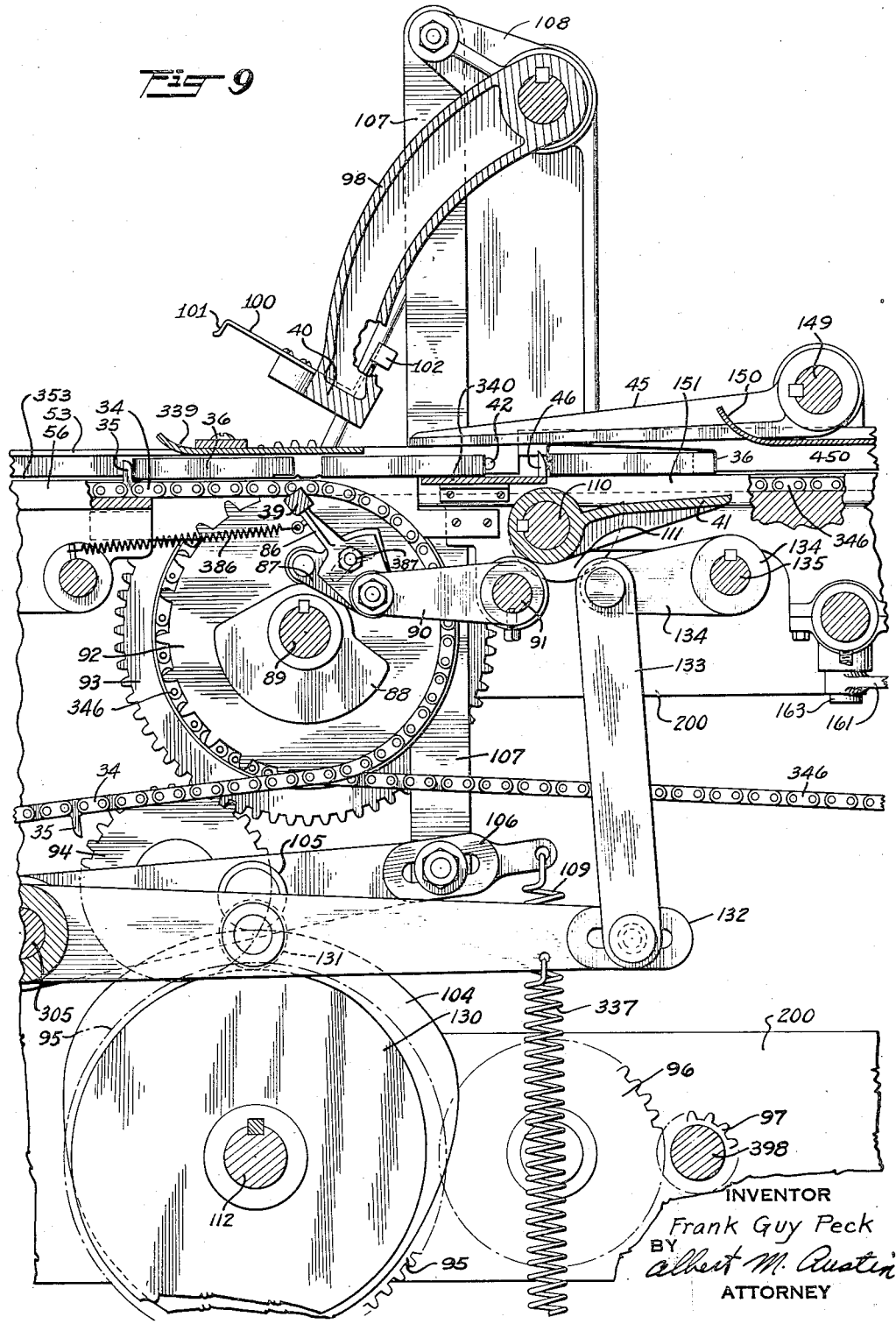

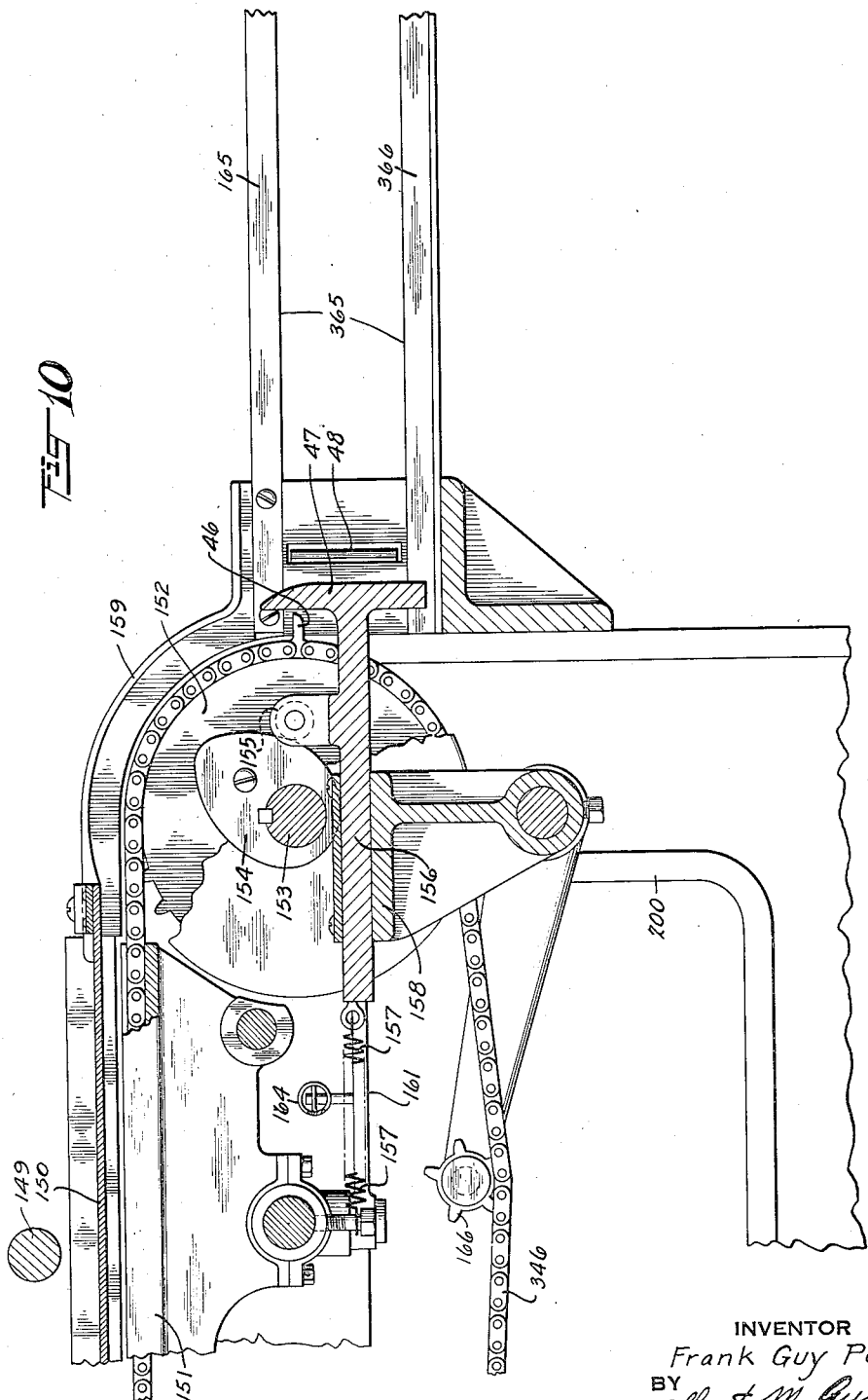

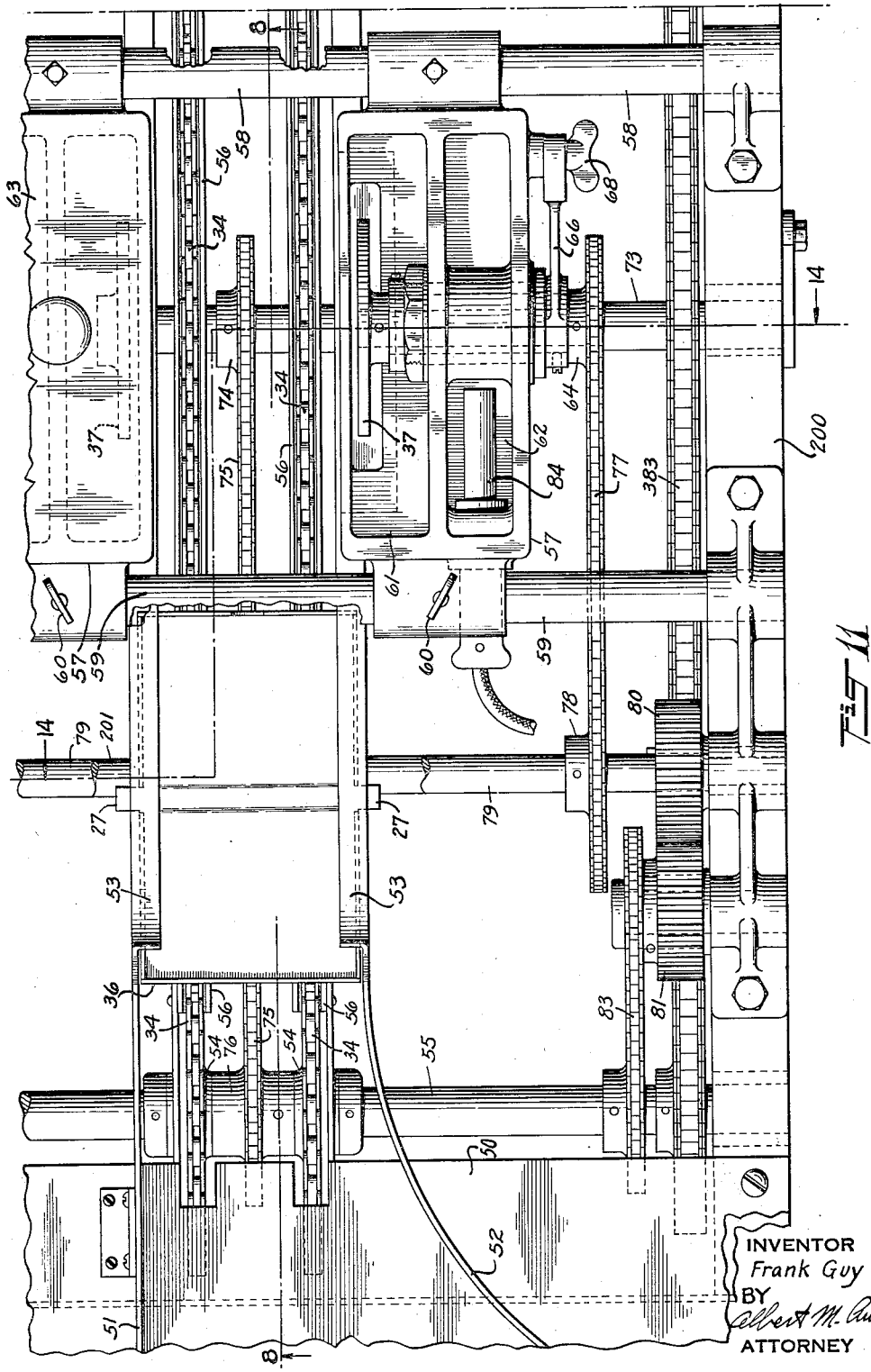

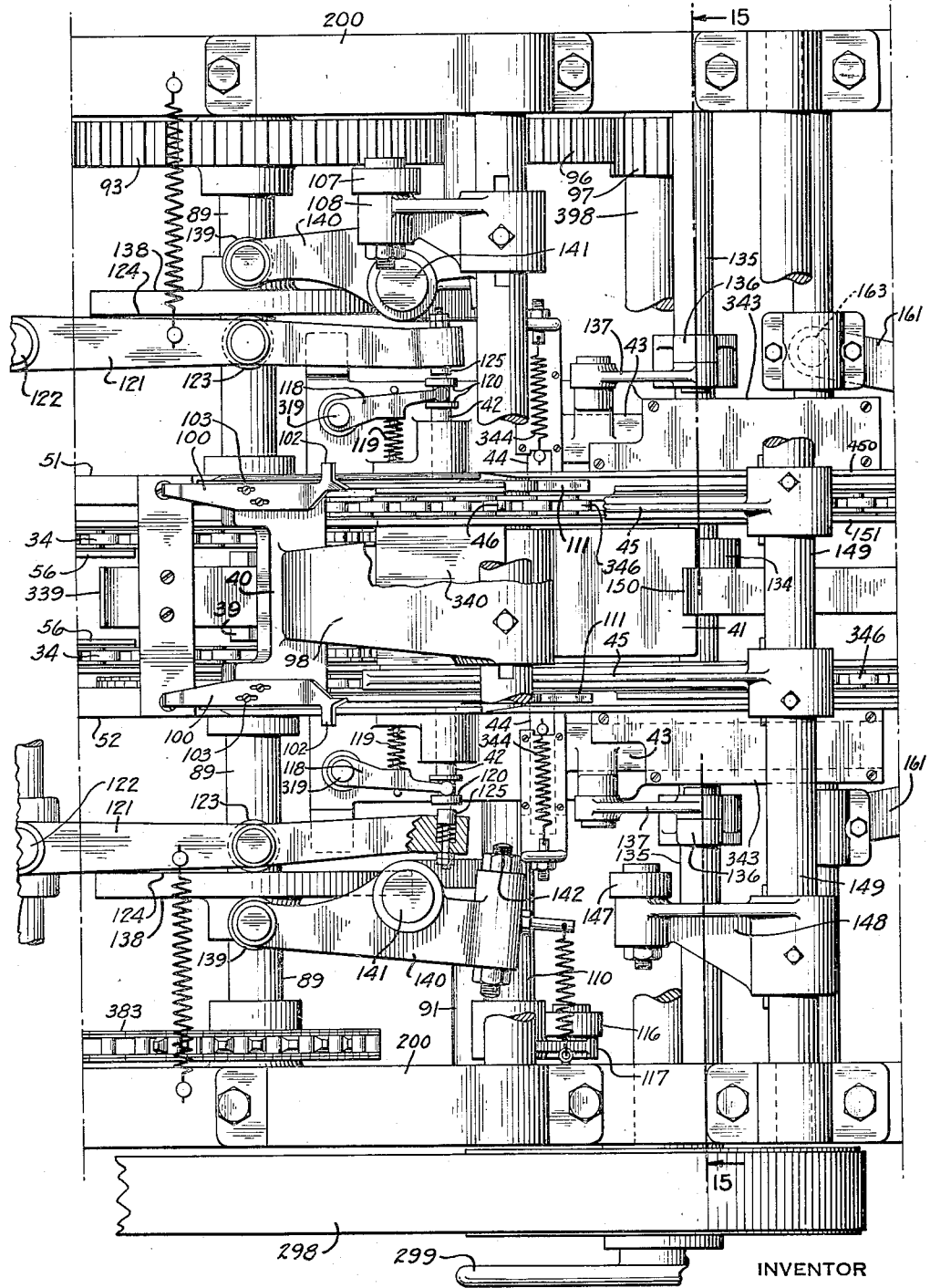

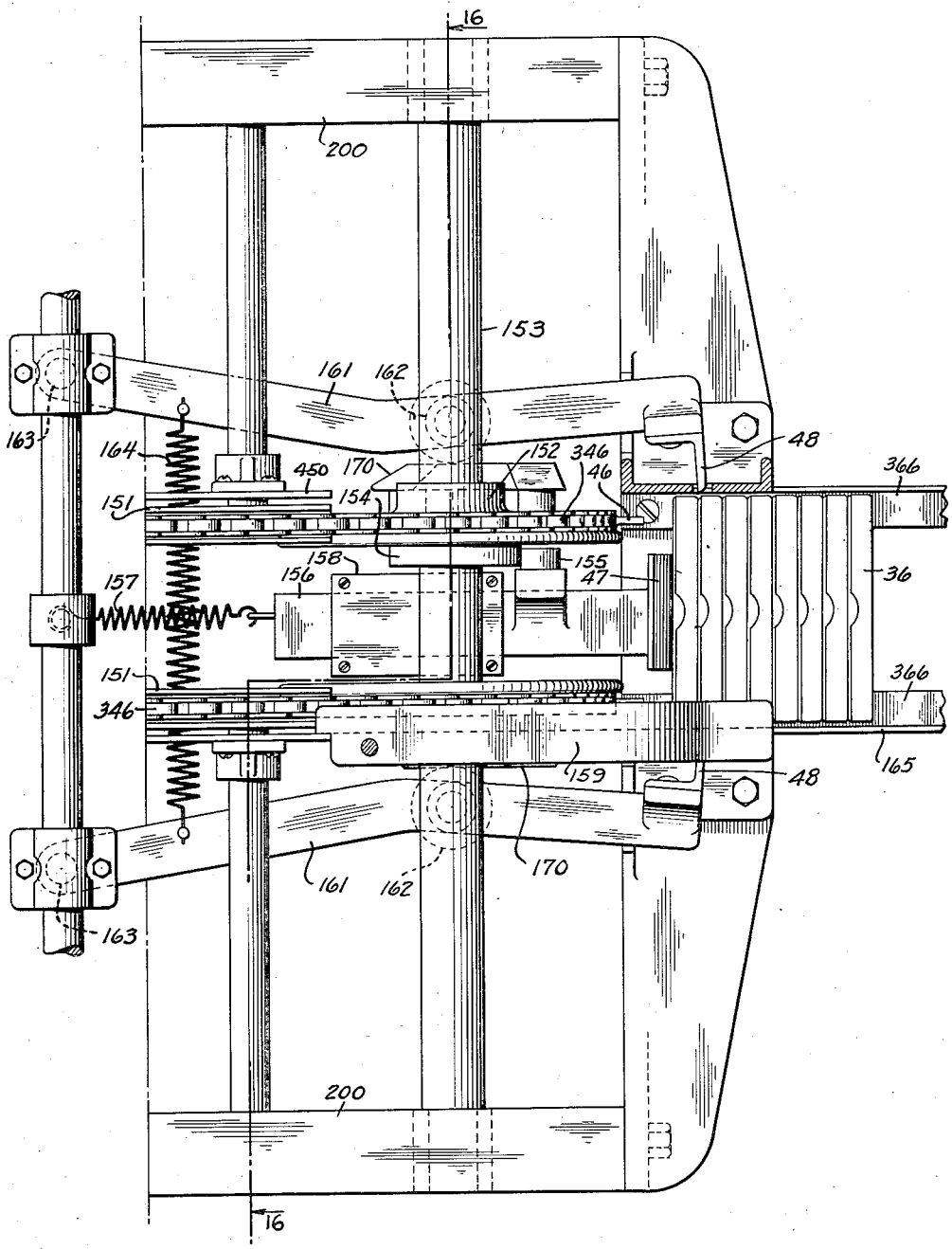

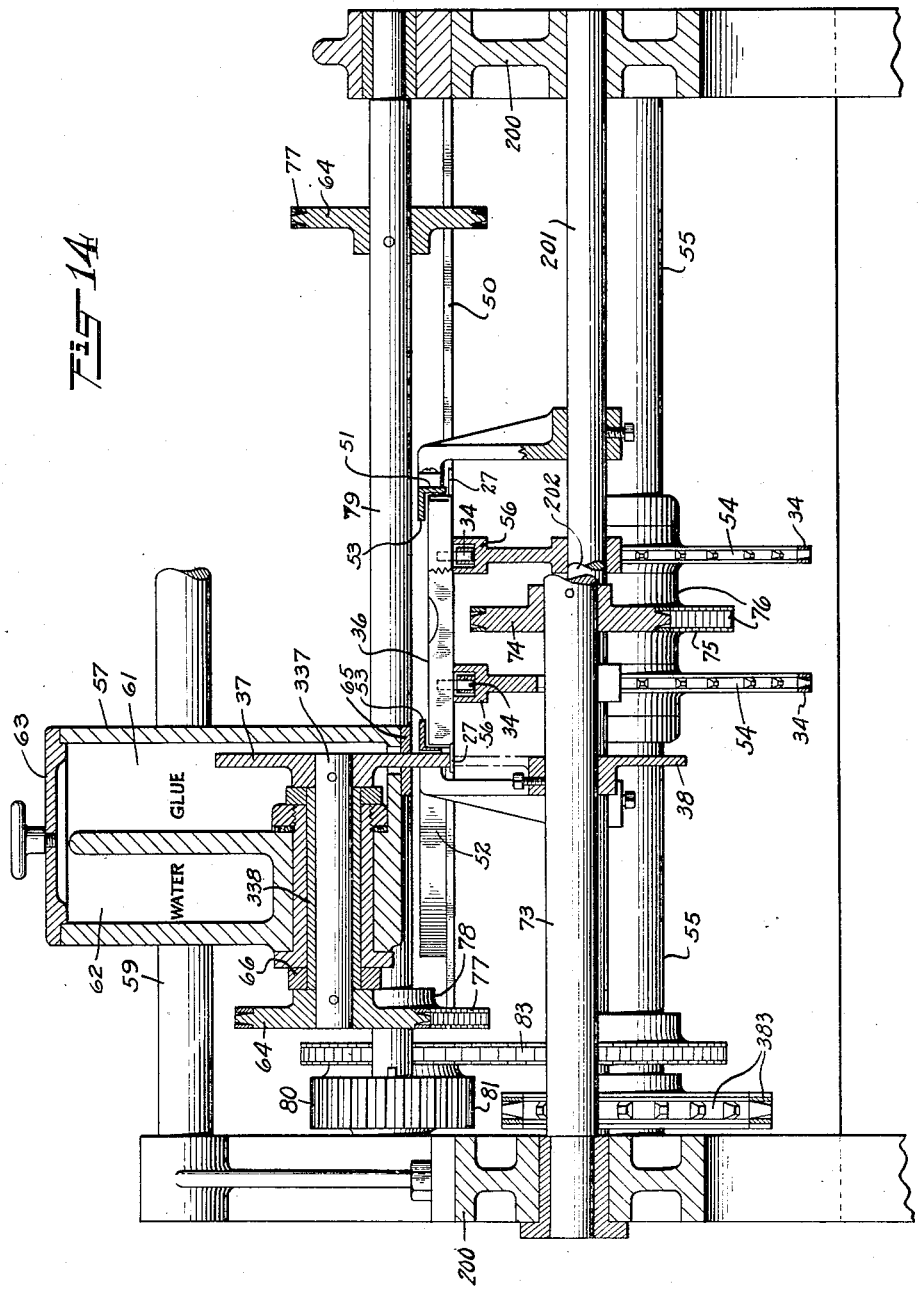

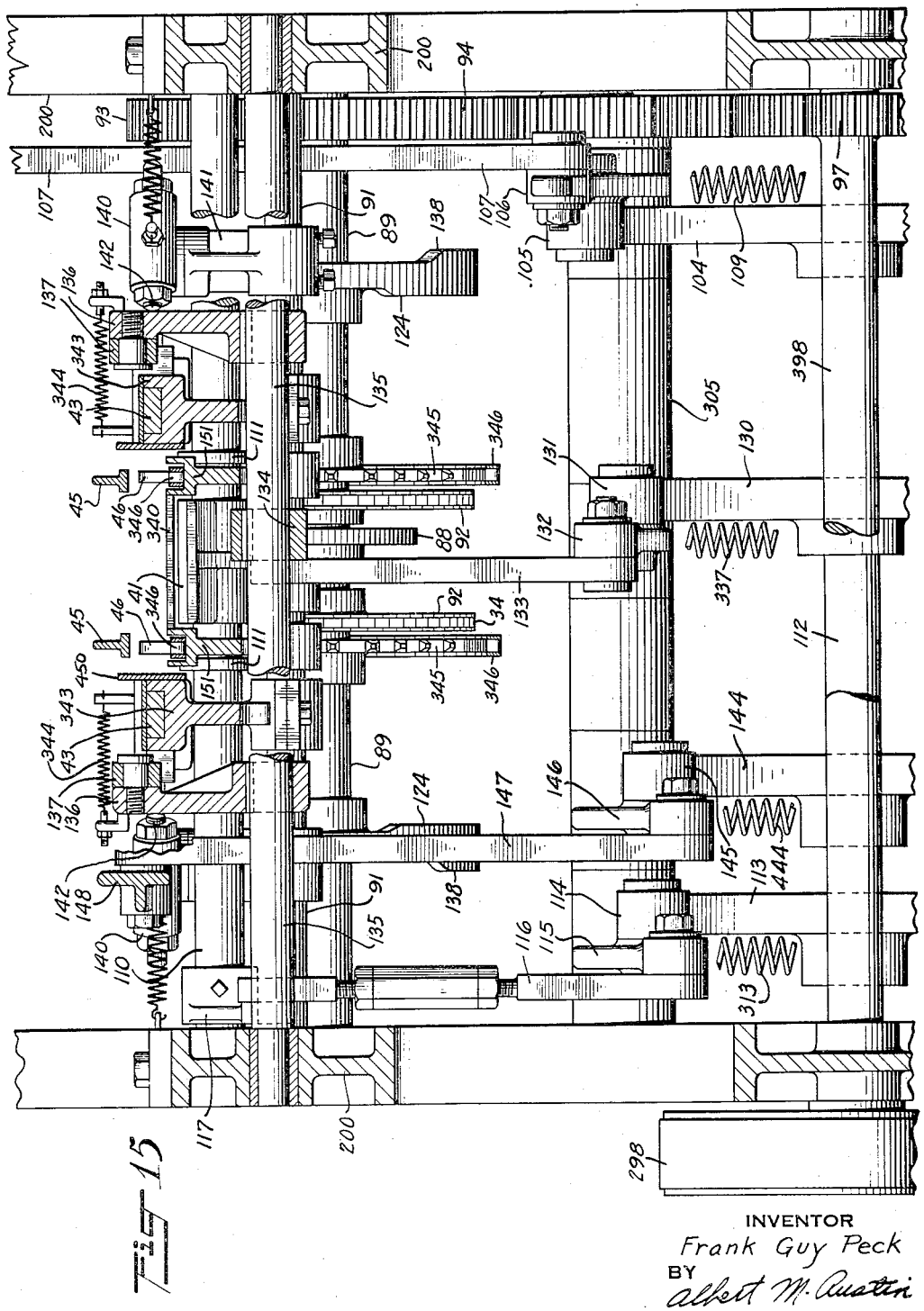

Nov. 6, 1934.      F. G. PECK      1,979,993
CONTAINER SETTING-UP MACHINE
Filed Sept. 17, 1931      12 Sheets-Sheet 12
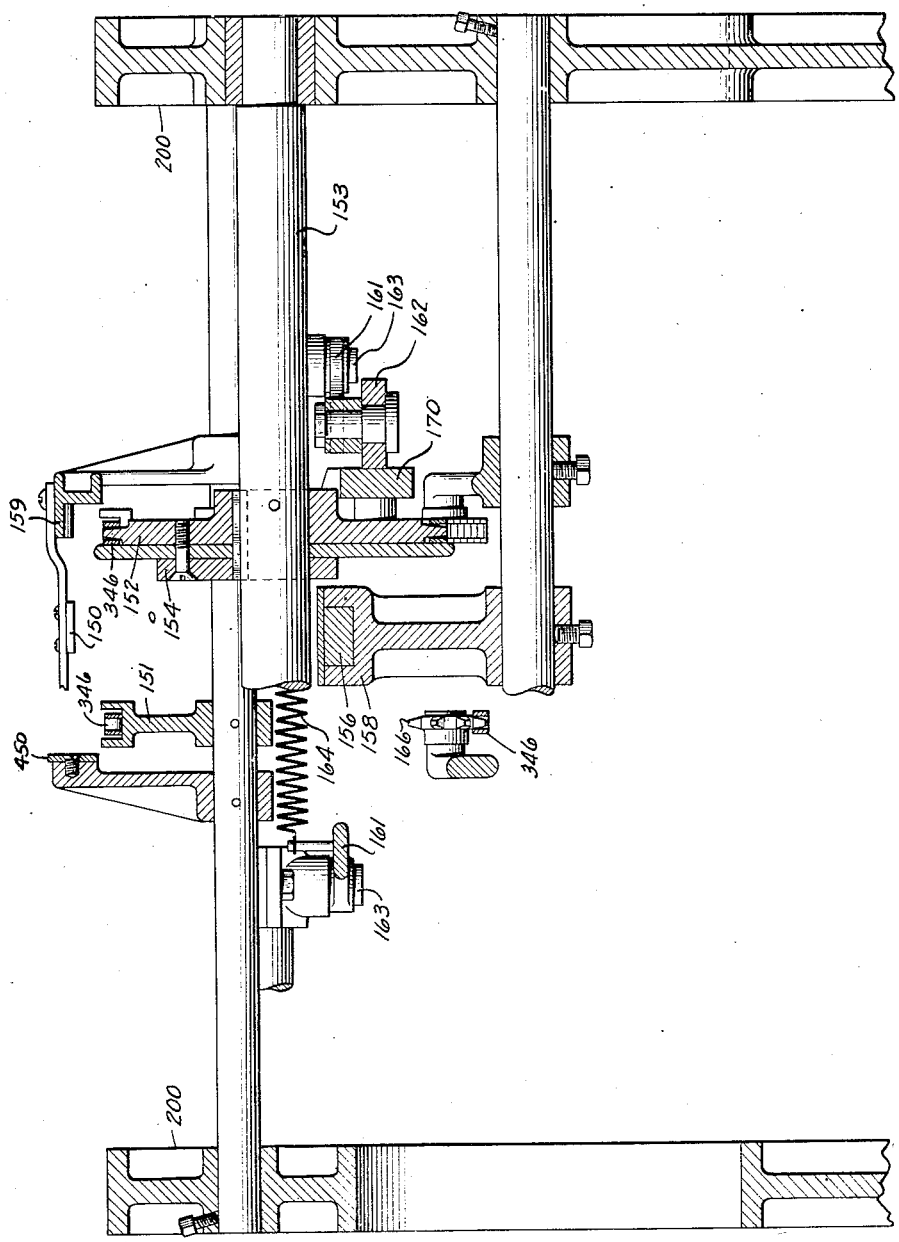
INVENTOR
Frank Guy Peck
BY
Albert M. Austin
ATTORNEY Patented Nov. 6, 1934

1,979,993

UNITED STATES PATENT OFFICE 1,979,993

CONTAINER SETTING-UP MACHINE

Frank Guy Peck, New Haven, Conn.

Application September 17, 1931, Serial No. 563,309

13 Claims. (Cl. 93—49)

The invention relates to box making apparatus, and more particularly to a machine for setting up containers made of paper board or the like.

According to one form of the invention, the container, which may be a flat hinged box suitable for holding cigarettes or the like, is fed to the machine, partially set up. A type of box, which the machine is especially adapted to set up, is disclosed in Application Serial No. 504,693, filed December 26, 1930, in the name of Champe S. Andrews.

The front and side walls of the bottom and cover of the box may be set up beforehand and the present machine may merely be used to set up the back wall of the bottom. The blanks, or partially set-up boxes, are preferably fed to the machine in open condition on a suitable conveyor which carries the box under a pair of gluing wheels to apply glue to the flaps which fasten the back wall to the side walls.

The box may be then conveyed to the setting-up position where a presser foot may hold the bottom of the box while a suitable folding plate raises the cover of the box and the back wall of the bottom to vertical position. To hold the side walls in position during gluing and to insure closing of the cover over or outside of the side walls suitable presser pins may press the side walls of the bottom against the presser foot.

Suitable carriages carrying suitable plungers may be provided for bending the flaps backward and then pressing them against the side walls of the bottom to securely glue them in place. After this is done, the presser pins may be withdrawn and the presser foot may be raised. The box is then allowed to continue through the machine and the cover may be folded down upon the bottom by a suitable closing member. The box may then be further fed through the machine in closed condition to insure contact between the flaps and the side walls until the glue dries. The boxes may then be delivered to a stacking device where they may be removed and packed for shipment to the packer.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Figs. 1 to 4, inclusive, are diagrammatic views illustrating the operation of the machine;

Fig. 5 is a perspective illustrating the details of the setting-up position;

Fig. 6 illustrates one form of partly set-up box in the condition in which it is fed to the present machine;

Fig. 7 is a perspective illustrating the presser foot carriage and plunger mechanism;

Figs. 8 to 10, inclusive, are vertical sections illustrating a complete section through the entire machine, when placed together in order;

Figs. 11 to 13, inclusive, are plan views, respectively, of the portions of the machine shown in Figs. 8 to 10;

Fig. 14 is a section taken on the line 14—14 of Fig. 11;

Fig. 15 is a section taken on the line 15—15 of Fig. 12;

Fig. 16 is a section taken on the line 16—16 of Fig. 13; and

Fig. 17 illustrates a detail of the gluing device.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring first to Fig. 6, the box disclosed is made from a single blank of paper board suitably creased and partially set up, as shown. The base comprises a bottom wall 20 having front wall 23 and side walls 24 and 25 secured thereto in any desired manner. The cover comprises a top wall 21 having side walls 29 and 31 and a front wall 30 secured to the side walls in any desired manner.

It will be noted that each of the upstanding walls of this partially assembled box has liners, or inner walls, formed integral with the side walls and bent downwardly within the box to strengthen the box and the side walls 24 and 25 are cut away to expose portions 28 on the inner walls to which the flaps 27, secured to back wall 26, are to be glued to complete the set-up of the box. Fig. 7 illustrates the position of the parts of the box just before the flaps 27 are glued to the portions 28. It will be understood that the flaps 27 are flush with the outer side walls 24 and 25 when the box is completely set up.

Referring now to Figs. 1 to 4, inclusive, the partially set-up box indicated by 36 is placed by the operator upon the feed table 50 with the cover end first. The box is then pushed on to suitable guides 56 (Figs. 8 and 11) partially surrounding the conveying chains 34 and is propelled by pins 35 secured to the chains. The box passes under a pair of gluing wheels 37 which apply strips of glue to the flaps 27, as illustrated in Fig. 4. The presser fingers 38 press the flaps up against the gluing wheels 37.

The box is continuously carried along by the chains 34 until it passes under the presser foot 40 which is timed so as to come down and clamp the box against the setting-up plate 340 and to seat within the box, as indicated in Figs. 2 and 7. The box has passed from the chains 34 and the pusher 39 is provided to carry the box onto plate 340 to proper position in register with the presser foot 40.

In this position side presser pins 42 move inwardly to press the side walls 24 and 25 inwardly to hold them against the presser foot. While the box is being held down by the presser foot 40, the folder 41 moves upwardly and raises the box cover and back wall 26 to vertical position, as indicated in Figs. 2 and 3. While in this position the carriages 43 (Figs. 4 and 7) move backwardly to bend the flaps 27 against the portions 28 of the side walls of the bottom of the box and then the plungers 44, carried by the carriages 43, firmly press the flaps 27 against the presser foot 40.

The box is then engaged by the next pins 46 on the next carrier chains 346, the presser foot is raised, the holding pins 42 are withdrawn, the folder 41 is withdrawn and the closing member 45 moves downwardly to force the cover down over the body of the box, as indicated in Figs. 1 and 3.

The box is then carried by the chains 346 to the stacking mechanism forming a stack of closed boxes, indicated by 49 in Fig. 4. The holder 47 holds the boxes stacked and auxiliary holders 48 swing inwardly to hold the edges of the last box in the stack while the main holder 47 is withdrawn to allow an additional box, indicated by 36 in Figs. 1 and 10, to be added to the stack.

Referring now to the remaining figures for a detailed description of the machine, the machine comprises a pair of side members, indicated generally by 200, having a plurality of tie rods, indicated by 201, 202, etc., to hold the machine together and also to provide convenient supports for the various pieces of apparatus, as will hereinafter be explained. Extending between the frame members 200 are also the several shafts on which the various operating parts are mounted, as will be hereinafter explained more in detail.

Referring now to Figs. 8 and 11, Fig. 8 being a section on the line 8—8 of Fig. 11, the feed table is denoted by 50. Above the feed table is disposed a straight stationary guide 51 and a curved stationary guide 52 which extend longitudinally of the machine and have top flanges 53, and slots 353 to allow the flaps 27 of the box to stick out. Between the guides are a pair of carrier chains 34 having spaced positioning pins 35 for engaging the boxes. The carrier chains 34 are mounted on sprockets 54 which are loose on shaft 55. These chains run in chain guides 56 which support the chain between the sprockets 54 and the other sprockets 92 (Fig. 9). It will be noted that the boxes slide along on the tops of the guides 56, being pushed by the pins 35 and are not carried directly by the chains 34.

The boxes are carried along by the pins 35 and pass under the glue wheels 37 which apply glue to the flaps 27 with the presser fingers 38 pressing the flaps against the glue wheels. There is a separate gluing device on each side of the machine and since both are alike it is only necessary to describe one in detail.

Each gluing device comprises a pot 57 (Fig. 14) having a water compartment 62, a glue compartment 61 and a removable cover 63. The pot 57 is supported on one side on tie rod 58 and on the other side upon tie rod 59 through the center position of an adjustable thumb screw 60. The water is heated by an electric heater element 84 which heats the water compartment 62, causing convection currents to heat the entire side of the glue chamber 61.

Located in the glue chamber is the glue wheel 37 which passes out through a plate 65 which is sufficiently tight to prevent loss of the glue.

Referring to Fig. 17 it will be noted that the space 71 is larger than the space 70, the space 70 controlling the thickness of the film of glue and the space 71 being slightly larger so that the film can pass back to the glue chamber without collecting at this point.

The size of the space 70 is controlled by adjusting the glue wheel 37 and for this purpose the glue wheel shaft 337 is journalled in an eccentric bearing 338 (Fig. 8) having an arm 66 connected thereto. The arm 66 has a slot 67 and a clamping screw 68 clamps the arm 66 in adjusted position. The position of the wheel 37 with respect to the flap 27 to take care of different thicknesses of stock is controlled by the thumb screw 60.

The presser fingers 38 are mounted upon a shaft 73 which is driven by a sprocket 74 driven by chain 75 which is driven by sprocket 76 driven by shaft 55. Each glue wheel 37 has mounted on the same shaft 377 therewith a sprocket 64 which is driven by a chain 77 which in turn is driven by a sprocket 78 mounted upon shaft 79.

The shafts 55 and 79 are driven through a main drive chain 383 which drives a sprocket located on shaft 55 (Figs. 11 and 12) and in turn is driven by the main drive shaft 112 (Figs. 9 and 12). The shaft 79 has mounted thereon a gear 80 which has meshing therewith a gear 81 which is driven by a chain 83 off shaft 55 (Fig. 11).

It will be noted that the side guides 51 and 52 are provided with enlarged recesses 85 to accommodate the glue thread which some times stretches between the wheel and the flap which finally breaks and snaps back to its respective supports. This prevents getting glue into the operating parts of the machine and thus gumming it up.

After passing under the glue wheels, the boxes are carried along on the supports 56 by the pins 35 to the setting-up position, indicated in Figs. 9 and 12. As the box approaches this position it passes under a stationary guide, indicated by 339, and is moved to the limit of the chains 34. At this time, the pusher 39 carries the box forward so that it is carried into register with the presser foot 40 which comes down and holds it against the plate 340. The pusher 39 is mounted upon an arm 86 which is pivoted to a support 90 which in turn is secured to a tie rod 91. The follower 87 is adjustably secured by bolt and slot 387 to the arm 86. The follower 87 runs upon a cam 88 mounted upon shaft 89. A spring 386 holds the follower 87 against its cam.

Referring now also to Fig. 7, the presser foot 40 has a large base which snugly fits within the bottom of the box. Angle members 100 are adjustably secured thereto by set screws 103 located in suitable slots. The angle members 100 have downturned ends 101 and upper angle ends 102, as indicated. The presser foot is mounted upon a presser arm 98 which is mounted upon a shaft 99 which in turn is operated by an arm 108 driven by a connecting rod 107, which is adjustably secured to lever 106 pivoted at 305. The lever 106 carries a follower 105 which is driven by a cam 104 (Fig. 15) mounted upon drive shaft 112. A spring 109 holds the follower 105 against its cam.

The various elements for controlling the operations of setting up are mounted upon shafts 89 and 112. Shaft 89 is driven by gear 93 which meshes with idler 94 which in turn meshes with gear 95 on shaft 112. Gear 95 is driven by gear 96 which in turn is driven by gear 97 mounted upon shaft 398 which is the pulley shaft, the pulley being driven by belt 298. A hand wheel 299 is mounted upon shaft 98 to turn the parts by hand, if desired.

The side presser pins 42 move inwardly to press in the side walls 24 and 25 against the presser foot 40 so that the closing members 45 will close the cover on the outside of the box body, as explained hereinafter. The presser pins 42 work in suitable guides and are normally held out by springs 119 engaging levers 118 which are pivoted at 319 and which engage between spaced collars 120 on the pins 42. To move the pins inwardly levers 121 are provided, these being pivoted at 122 and having spring pressed contacts 125. The levers 121 carry followers 123 which engage the face cams 124 mounted on shaft 89.

The folder plate 41 and auxiliary folder plates 111, all of which are mounted upon shaft 110, rise. Shaft 110 is moved by arm 117, (Fig. 15) which is moved by a connecting rod 116, adjustable in length. Connecting rod 116 is moved by lever 115 which is pivoted to the common pivot point 305 and carries a follower 114 working on cam 113, which is mounted upon the cam shaft 112. Spring 313 holds the follower 114 against its cam.

Carriages 43 move backward carrying the plungers 44 which press the flaps 27 against the portions 28. The carriages 43 slide in ways 343 and have secured thereto links 137 which are connected to arms 136 secured to shaft 135, which in turn is moved by an arm 134 connected to link 133 which is adjustably connected to lever 132 pivoted at 305 and having follower 131 driven by cam 130 mounted upon a cam shaft 112. Spring 337 holds the follower 131 against the cam 130.

As the carriages 43 move back, the plungers 44 are moved inwardly by levers 140 pivoted at 141 and having adjustable contact members 142. The plungers 44 are normally held in outer position by springs 344, and as they move opposite the contact members 142, they are driven inwardly thereby to press the flaps firmly against the side walls of the bottom of the box. The levers 140 carry followers 139 which engage the side faces of cams 138 integral with face cams 124 and mounted upon shaft 89.

The closing members 45 are mounted upon shaft 149 to which an arm 148 is secured which is moved by link 147 which extends to a lever 146 pivoted to the common pivot point 305 and having a follower 145 which engages cam 144 which is mounted upon cam shaft 112. Spring 444 holds the follower 145 against its cam.

It will be noted especially in Fig. 5 that small flat members 443 are attached to the carriages 43 to bridge the space in the side guides 450 necessary for the movement of the carriages to prevent the boxes from getting stuck at the edges of this space.

When the presser foot 40 is raised, the machine is so timed that pins 46 on the conveyor chains 346 engage the box, moving it under the closing members 45, as they move downwardly and thence under stationary guides 150, as indicated in Fig 9. The chains 346 are mounted upon a pair of sprockets 345 mounted upon shaft 89 and extend in grooved supports 151 which support the chains between the sprockets. These chains extend to forward sprockets 152 which are mounted upon shaft 153 (Figs. 10 and 13). The box passes closed under guides 150, being propelled by pins 46 and supported upon the supports 151. The boxes are carried over the sprockets 152 and are guided by angled, curved guides 159 to position within a stacker 365 made up of lower angle irons 366 and upper side members 165. The boxes are stacked in a stacker, as indicated in Fig. 13, and are held in stacked relation against a forward stop (not shown) by a holder 47 which is periodically withdrawn by the operation of cam 154 on shaft 153 engaging follower 155. A spring 157 connected to slide 156 works in a support 158, the end of spring 157 being connected to an adjacent tie rod.

To prevent the boxes from moving backward when the holder 47 is withdrawn to allow the admission of an additional box (36), auxiliary holders 48 are provided, passing through side slots and engaging the edges of the last box. The auxiliary holders 48 are mounted upon arms 161, which are pivoted at 163 to an adjacent tie rod and are controlled by followers 162 working upon face cams 170 which are mounted upon the shaft 153. A spring 164 connects the two levers 161 to urge their followers against the cams.

It will be noted that suitable idler sprockets 166 keep the chains 346 tight and idler wheels 167 keep the chains 34 tight. It will be understood that all parts are adjustable for different widths of boxes and also for different styles of boxes. The timing of the various operating steps may be changed by changing the speed ratios or by changing the shape of the several cams. Although one particular type of box has been used for illustrating the operation of the machine, it will be understood that other types of boxes may be used equally well, as, for instance, a single wall box. It will be understood that the boxes may or may not be partially assembled before feeding to the machine and that they may or may not be printed with a decorative label or design before being fed to the machine.

It is thought that the operation of the machine will be obvious to those skilled in the art from the above description. It suffices to say that the operator places the box with the cover end forward upon the table 50 and against the guide 51 and pushes it forward until it engages the forward stop. The engagement of the box with the chain supports 56 and the guides 51 and 52 is sufficient to hold the box stationary until the next pair of pins 35 engages the rear of the box to push it forward in proper timing with the various operating steps.

The stacks of closed boxes are removed from the stack holder 365 and delivered stacked for shipment to the packer. The expedient of closing the box immediately after it is glued assists in holding the glued parts in proper relation until the glue dries and also saves the operation of closing the box by hand and also permits delivery of the closed boxes in stacks ready for delivery. The side guides 450, side walls of curved guides 159, and the side walls of lower angle irons 366 and upper side members 165 of stacker 365 guide the closed box laterally and assist in holding the side walls of the upper cover against the side walls of the bottom. This assists in holding the glued parts 27, 28 in place till the glue sets.

Concerning the steps of setting up the box, at about the time the presser foot 40 clamps the box against the setting-up plate 340, the presser pins 42 clamp the side walls of the box bottom against the presser foot. Then the folder members 41 and 111 rise, folding the cover and box back against the presser foot. The carriages 43 then move back, bending back the flaps against the side walls and the plungers press them firmly against the side walls.

Then the presser pins and the plungers 44 withdraw and the folders 41 and 111 drop and the presser foot 40 rises. The second pins 46 then engage the box, carrying it forward, at the same time the closing member 45 drops down, folding the box cover down over the box bottom.

It will be understood that the various movements above described are governed by the cams and the times of these movements may be altered within limits by changing the shape of the cams and by other changes apparent to those skilled in the art.

While certain novel features of the invention have been disclosed and are pointed out in the annexed claims, it will be understood that various omissions, substitutions and changes may be made by those skilled in the art without departing from the spirit of the invention.

What is claimed is:

1. In a machine for setting up hinged boxes, feeding devices for feeding the boxes, gluing devices for applying glue to the transverse flaps on the boxes, a presser foot adapted to seat within the bottom of the boxes, means for bending upward the cover of the box and the back wall thereof about the presser foot, carriages, one on each side, plungers carried by said carriages, means for moving said carriages to bend said flaps around the corner of the presser foot, and means for moving said plungers to press side flaps against the side walls of the bottom of the box, presser members for holding said side walls against said presser foot while said flaps are being glued to said side walls, a closing member, and means for moving said closing member to close the cover as said box is carried by it.

2. In a machine for setting up boxes, feeding devices for feeding the boxes, gluing devices for applying glue to the transverse flaps on the boxes, means for diverting the cover of the box and the back wall thereof with respect to the bottom of the box, means for bending said flaps and for pressing them against the side walls of the bottom of the box, and means for closing the cover over the bottom.

3. In a machine for setting up one-piece flat hinged boxes having a bottom and cover, devices for feeding the one-piece boxes in semi-set up form, means for securing the back wall of the bottom of the box to the side walls thereof, and means for closing the cover of the box over the bottom thereof after said back wall is secured to said side walls.

4. In a machine for setting up containers, feeding devices for feeding the container, gluing devices for applying glue to the transverse flaps on the container, a presser foot adapted to seat within the container, means for diverting the cover of the box and the back wall thereof, carriages, one on each side, plungers carried by said carriages, means for moving said carriages to bend said flaps around the corner of the presser foot, and means for moving said plungers to press side flaps against the side walls of the bottom of the box, presser members for holding said side walls against said presser foot while said flaps are being glued to said side walls, a closing member, means for moving said closing member as said container is carried thereby to close the container.

5. In a machine for setting up one-piece hinged boxes, devices for feeding the boxes, means for adhesively securing parts of the boxes together and means for thereafter closing the boxes and holding them closed while the adhesive sets.

6. In a machine for setting up hinged containers comprising a bottom and a cover, a setting-up plate, a presser foot having forward and side walls and adapted to seat within the bottom of the container, supporting members secured to said presser foot, a folder for bending the cover and back wall of said container with respect to said presser foot to engage said supporting members.

7. In a machine for setting up containers, a carriage, a plunger carried by said carriage, means for moving said carriage and container relatively to bend a first part of said container against another part thereof, and means for moving said plunger and carriage relatively to engage said first part of the container.

8. In a machine for setting up containers, devices for applying adhesive to parts of the container, a support for the container, a pair of carriages on either side of said support, plungers carried by said carriages, means for moving said carriages and container relatively to bend said parts of said container against other parts thereof, and means for moving said plungers inwardly to engage said parts of the container and to adhesively secure said parts to said other parts.

9. In a machine for setting up boxes, a conveyor having register abutments receiving the boxes, a pair of gluing wheels above said conveyor for applying glue to the transverse flaps on a box, a presser member for each wheel and pressing the flaps against the wheel, a setting-up plate spaced from said conveyor, a presser foot pivoted above said setting-up plate and adapted to seat within the bottom of the box, a pusher member under said presser foot for pushing the box from said conveyor to said plate to bring the box in register with said presser foot, means for raising the cover of the box and the back wall thereof to substantially vertical position above the lower edge of said presser foot, carriages, one on each side, plungers carried by said carriages, means for moving said carriages rearwardly to bend said flaps around the corner of the presser foot, and means for moving said plungers inwardly to press side flaps against the side walls of the bottom of the box, a second conveyor having register abutments for further feeding said box, a closing member pivoted above said second conveyor, means for moving said closing member downwardly as said box is carried thereunder to close the box.

10. In a machine for setting up containers, a feed table, a conveyor having register abutments receiving boxes from the feed table, a pair of gluing wheels above said conveyor for applying glue to the transverse flaps on the container, a presser member for each wheel for pressing the flaps against the wheel, a setting-up plate in the path of the container, a presser foot pivoted above said setting-up plate and adapted to seat within the bottom of the container, a pusher member under said presser foot for pushing the box from said conveyor to said plate to bring the box in register with said presser foot, means for raising the cover of the container and the back wall of the bottom thereof to substantially vertical position above the lower edge of said presser foot, carriages, one on each side, plungers carried by said carriages, means for moving said carriages rearwardly to bend said flaps around the corner of the presser foot, and means for moving said plungers inwardly to press said flaps against the side walls of the bottom of the container, presser members for holding said side walls against said presser foot while said flaps are being glued to said side walls, a second conveyor having register abutments for further feeding said box, a closing member pivoted above said second conveyor, means for moving said closing member downwardly as said container is carried thereunder to close the container, and means for delivering said closed container from the machine in stacks.

11. In a machine for setting up hinged containers comprising a body having a bottom wall, side walls and front wall previously set up and also comprising a cover; a setting up plate, a presser foot having forward and side walls adapted to seat within the body of the container, and a folder for bending the back wall of said body and said cover with respect to the presser foot to engage said presser foot.

12. In a machine for setting up one-piece boxes having a body and a cover, devices for feeding the one-piece boxes in a semi-set-up form, the bodies of said boxes having their bottom, front and side walls already set up, the covers of said boxes having their top, front and side walls already set up, means for setting up the back wall of the box, and means for closing the cover of the box over the body thereof.

13. In a machine for making containers having a body and a cover, devices for setting up the containers, devices for adhesively connecting parts of the containers, means for thereafter closing the cover on the body of said containers and stacking devices for stacking said set-up closed containers, whereby the closed containers act to hold the adhesively connected parts in contact until the adhesive sets.

FRANK GUY PECK.